Dec. 25, 1934.   G. TER MEER   1,985,589
MECHANISM FOR CONTROLLING THE OPERATION OF MACHINES AND APPARATUS
Filed May 16, 1933   4 Sheets-Sheet 1

Fig.1.

INVENTOR
Gustav ter Meer
BY
ATTORNEYS

Dec. 25, 1934. G. TER MEER 1,985,589
MECHANISM FOR CONTROLLING THE OPERATION OF MACHINES AND APPARATUS
Filed May 16, 1933 4 Sheets-Sheet 2

INVENTOR
Gustav ter Meer
BY
ATTORNEYS

Dec. 25, 1934.  G. TER MEER  1,985,589
MECHANISM FOR CONTROLLING THE OPERATION OF MACHINES AND APPARATUS
Filed May 16, 1933   4 Sheets-Sheet 3

INVENTOR
Gustav ter Meer
BY
ATTORNEYS

Patented Dec. 25, 1934

1,985,589

UNITED STATES PATENT OFFICE 1,985,589

MECHANISM FOR CONTROLLING THE OPERATION OF MACHINES AND APPARATUS

Gustav ter Meer, Munich, Germany, assignor to Albert T. Otto & Sons, New York, N. Y., a corporation of New York Application May 16, 1933, Serial No. 671,316
In Germany June 11, 1932

20 Claims. (Cl. 121—147)

The present invention relates to a control device for an automatically operated machine, and more particularly for a centrifugal machine.

In automatically operated centrifugal machines, it is desirable that certain functions, operations, or series of steps be automatically repeated in the proper sequence at regular or controlled intervals. These functions may consist, for instance, in the removal of the separated material by a scraper knife, in the operation of an inlet or cut-off valve, and in the operation of other devices associated with centrifugal machines.

The present invention is an improvement over the general type of control devices shown in my prior Patent No. 1,284,125. In this patent I effect the control of these devices by means of a slowly rotating master control disc which regulates the operation of fluid operated motors connected to the various devices of the centrifugal machine. In this construction, the control disc is equipped with control pins which project from the disc and which intermittently operate a spring-pressed lever in the path of movement of said pins. This lever is connected to a coupling located between a constantly running drive shaft and a control shaft having a plurality of cams mounted thereon. These cams respectively operate valves which control the delivery of actuating fluid to the fluid motors to which the various devices of the centrifugal machine are connected. With this construction, when a control pin moves into contact with the lever, it effects the engagement of the coupling and the consequent rotation of the control shaft from a state of rest. The rotation of this control shaft causes the movement of one of the cams into position to actuate the valve associated therewith.

One object of the present invention is to provide a control device which is simple in design and inexpensive.

Another object of the present invention is to reduce to a minimum the time lag from the movement of the control disc into one of its motor operating positions to the beginning of operation of the corresponding motor.

Another object is to provide a control device which may be easily adjusted or operated by hand to effect the desired time relation between working operations, or for any other reason.

Another object of the invention is to provide a control device in which a greater degree of selectivity may be effected in the timing of the sequences of operation of the various working devices.

As an important feature of the present invention, each valve for controlling the operation of its associated motor comprises a stepped or differential piston which, in both direction of its movement, is controlled by the same pressure medium which is delivered to the motor, the pressure acting upon the piston being varied by the operation of the control disc.

Various other objects, advantages and important features will be hereinafter pointed out or will be apparent from a consideration of the specific construction illustrated in the accompanying drawings which constitute a few of the many possible embodiments of the invention hereinafter claimed.

Figure 1:
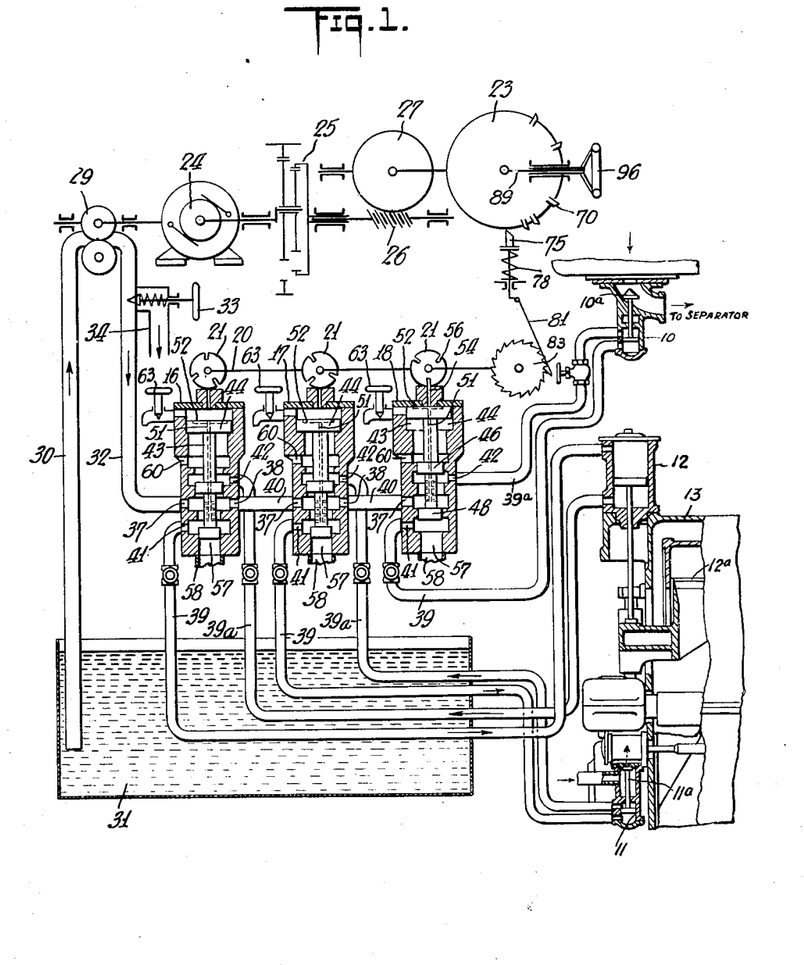
Fig. 1 is a diagrammatic view, with certain parts partly in section, of one form of control device embodying the present invention.

In the specific form shown in Fig. 1, I employ a number of working cylinders or fluid actuated motors which operate the various mechanisms of the centrifugal machine, such as the scraper knife, inlet valve, wash valve, cut-off valve and the like. Three such motors or cylinders 10, 11 and 12 are shown, each having a piston slidable therein and connected by a piston rod to one of the mechanisms to be operated. The motors 10, 11 and 12, in the specific form shown, operate the supply valve 10a, wash valve 11a, and scraper knife 12a, respectively, of the separator 13 which may be of the general type shown in my prior Patent No. 1,925,121.

The operation of the motors 10, 11 and 12 is controlled respectively by three reversing valves 18, 17 and 16 which serve to admit fluid under pressure to one side or the other of the pistons of their associated motors. The selective operation of these valves 16, 17 and 18 is effected through a control shaft 20 which carries control members 21, each of which cooperates respectively with one of the reversing valves. These control members 21 are rotated together intermittently at selective intervals in accordance with the setting on a master control member in the form of a disc 23.

The disc 23 is driven by a suitable source of power as for instance an electric motor 24, the transmission between said drive and said motor including a reduction gearing 25 connected to a worm 26 which drives a worm wheel 27 which in turn drives the control disc 23 through a gear chain.

The pump for supplying actuating fluid is shown in the form of a gear pump 29 having an inlet or suction pipe 30 extending into an oil well or tank 31, and a main outlet supply pipe 32 which delivers oil under pressure to the various reversing valves. The flow of fluid through the supply pipe 32 is advantageously controlled by means of an automatically operated spring-pressed valve 33, which, when the pressure in the pipe 32 exceeds a certain amount, is opened to permit oil to be by-passed to a pipe 34 and back into the well 31. Although oil is used as the actuating medium, it must be understood that any other suitable medium may be used.

Means are provided for delivering oil under pressure successively to the valves 16, 17 and 18 from the supply pipe 32. For that purpose, each reversing valve includes a valve casing having an inlet port 37 through which the oil under pressure is delivered to the valve and then to either side of its associated piston in the motors 10, 11 and 12 in accordance with the position of the valve. The casings of the two valves 16 and 17 are provided with outlet ports 38 which communicate, by means of pipe connections 40, with the inlet ports 37 of the valves 17 and 18 respectively, and which are on the same level as said inlet ports 37. By means of this arrangement, the oil under pressure is delivered from the main supply pipe connections 32 to the inlet port 37 of the valve 16, and then successively through the three valves 16, 17 and 18.

In order to deliver oil to either side of the pistons in the motors 10, 11 and 12, each valve is provided with two ports 41 and 42 communicating respectively with opposite ends of their associated working cylinder by means of pipes 39 and 39a, these ports being controlled in accordance with the position of the valve to admit fluid to one side of the piston, while the other side is permitted to exhaust.

Figures 5, 10, 11:
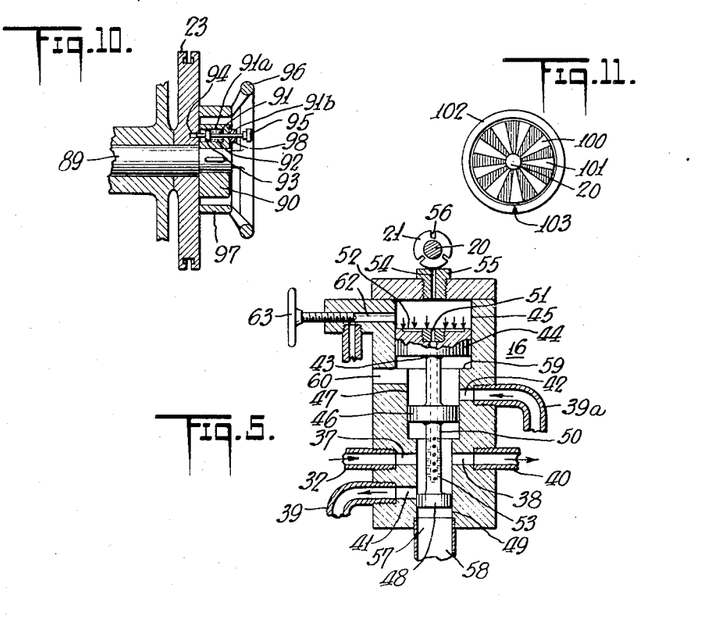
Fig. 5 is a vertical section of a reversing valve, but somewhat modified from that shown in Fig. 1.
Fig. 10 is a section of the means for disengaging the control disc from the drive of the control device, and for manually operating said disc.
Fig. 11 is a plan view of a device for indicating the operations taking place in the centrifugal machine.

As a feature of the present invention, the valve member for controlling the flow of fluid through the ports 41 and 42 is in the form of a differential or stepped valve piston 43 slidably mounted in each casing, and comprising a plurality of piston sections of different diameters. This piston, in the specific form shown, comprises a section 44 at its upper end, which fits in a correspondingly sized bore 45 in the casing, an intermediate section 46 of smaller diameter fitted in a correspondingly sized bore 47, and a lower section 48 having the smallest diameter and slidable in a correspondingly sized bore 49. These piston sections are interconnected by a piston rod 50 which is smaller than any of said bores of the casing, so that the actuating fluid may flow therearound. The port 41 is located between the extreme positions of the lower piston section 48 and communicates with the bore 49, and the port 42 is located between the extreme positions of the intermediate piston section 46, and communicates with the bore 47. These bores 47 and 49 may be continuous as shown in Fig. 5, or may be interrupted by an enlargement of the bores in the horizontal sections of the ports 41 and 42 as shown in Fig. 1.

The inlet port 37 is located between the two piston sections 46 and 48, the axial movement of the piston being limited, so that said inlet port will always be in this relative position. This inlet port 37 will communicate with either one of the ports 41 and 42 in accordance with the position of the piston 43.

The movement of the valve piston 43 is effected through the fluid action on the top or outer end of the piston section 44. In order that the fluid from the inlet port 37 may be delivered to the bore 45 on top of said piston section 44, there is provided a passageway 51 extending axially of the piston and opening into a depression 52 on top of the piston section 44, so that the oil may find its way between the horizontal surface of said section and the end of the valve casing. The piston rod 50 between the two piston sections 46 and 48 has a number of radial bores 53 which communicate with the central bore or passageway 51.

Assuming that the piston 43 is in its uppermost position as in the valve 18, liquid under pressure will enter the inlet port 37, travel through the central bore 51 of the piston, and find its way to the top of the piston section 44. This fluid which reaches the top of the valve casing may act either on the piston to move it downwardly, or may pass out through an outlet opening 54 and flow back into the well 31. This outlet opening 54 communicates with the upper bore 45 and is advantageously formed in a plug 55 connected to the valve casing. The outlet end of this opening 54 is controlled by the control members 21, so that if the opening 54 is uncovered, the liquid will flow through it and back into the well 31, but if the outlet end of this opening is closed, the fluid pressure will build up behind the piston section 44 and force the piston downwardly.

The control members 21 are advantageously in the form of discs having radial slots or cut-outs 56. When one of these slots 56 is opposite to the opening 54, the liquid from the interior of the valve will escape through the opening 54 and out through said slot 56 into the oil well 31.

In the position of the valve 18 shown in Fig. 1, the opening 54 is uncovered so that no substantial pressure can be built up behind the piston section 44 to move it downwardly. As long as the opening 54 is uncovered the differential pressure acting between the two piston sections 46 and 48 will maintain the piston 43 in its uppermost position. In this position, the liquid under pressure enters the inlet port 37 and passes through the port 42, through the pipe connection 39a and into the top of the piston of the cylinder or motor 10 as shown in Fig. 1. Also, in this position, the piston section 48 is above the port 41, so that this port communicates with an opening 57 at the bottom of the valve casing, this opening 57 advantageously having a pipe 58 connected thereto and leading back into the oil well 31. Under these conditions, the liquid on the bottom side of the piston in the motor 10 is exhausting through the pipe connection 39 into the port 41 and then through the pipe 58 back into the oil well 31.

When the control member 21 of the valve 18 has been rotated so as to block the passage of liquid through the outlet 54, the pressure on top of the piston section 44 in said valve will be sufficient to move the valve piston 43 downwardly. The movement of this piston downwardly is limited by means of a seat 59 formed at the bottom of the bore 45, so that in its extreme lowermost position the piston section 44 will be seated upon said seat as shown in the position of the valves 16 and 17. In this position of the valves 16 and 17, the inlet ports 37 communicate with the ports 41 so that liquid under pressure will be delivered to the bottom side of the piston in the cylinder or motor 11, and to the upper side of the piston in the cylinder or motor 12. At the same time, the liquid from the opposite sides of the pistons is being exhausted through the ports 42 and out through the outlet ports 60 disposed on the upper end of the bores 47. In order that the operation of any one of the reversing valves may be discontinued without interfering with the operation of the other valves, each valve has an exhaust port 62 at the upper end of the bore 45, the outlet end of this port being controlled by means of a hand-operated valve 63. This valve may have a valve member extending vertically as shown in Fig. 1, or horizontally as shown in Fig. 5. As long as this valve 63 is closed, the valve piston 43 associated therewith will be operated intermittently from the control device. When this valve 63 is opened, the liquid delivered to the top of the piston section 44 is bypassed through the valve 63 and into the oil well 31, so that the valve is not operated.

For the purpose of intermittently operating the control shaft 20 at selective intervals from the constantly rotating disc 23, said disc carries a series of control pins 70, the settings of which determine the operation of the control shaft. As a feature of the present invention, these pins may be set in any selective position with respect to the disc 23. For that purpose, said disc is formed on the periphery thereof with a T-shaped slot 71 into which is fitted a series of bolts 72 having T-shaped heads which fit into the base of the slot and which support the control pins 70. The disc 23 may be provided with an opening (not shown) between the slot 71 and a face of the disc to permit insertion of the bolts 72 into said slot.

Figure 7:
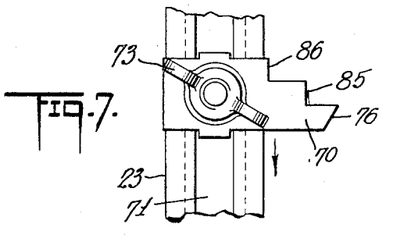
Fig. 7 is a plan view of the portion of the disc and control pin shown in Fig. 6.
Figure 8:
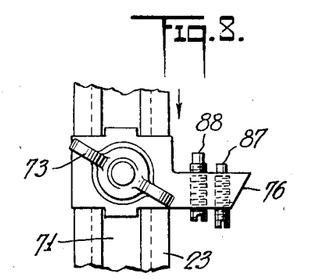
Fig. 8 is a plan view of another form of control pin.
Figure 9:
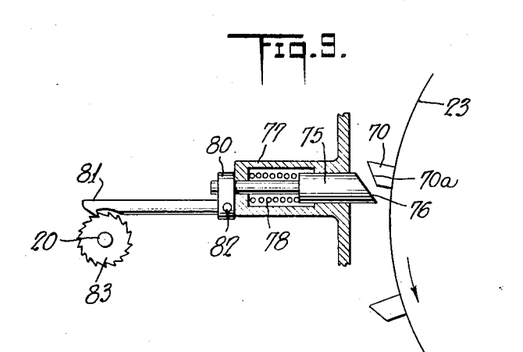
Fig. 9 is a section showing details of a pawl and ratchet device operated by the control pins.

The pins 70 may extend radially outwardly from the control disc 23 as shown in Figs. 1 and 9, or may extend transversely of the plane of said disc as shown in Figs. 2, 4, 6, 7 and 8. In the construction shown in these latter figures, the pins are fastened into position by means of nuts advantageously in the form of wing nuts 73 threaded to the outer ends of the bolts 72. By means of this arrangement, the control pins 70 may be moved circumferentially in any desired position and locked therein.

The means for operating the control shaft 20 from the control pins 70 includes a bolt 75 disposed in the path of circular movement of said pins, and having a cam face 76 adapted to be engaged by corresponding cam surfaces 70a at the outer ends of the control pins 70 as said pins are moved into operating position. The bolt 75 is slidably movable in a guide casing 77 and is spring-urged towards the disc 23 by a spring 78 in said casing.

A portion of the bolt 75 extends beyond said casing, and has connected thereto a bracket 80 to which is pivotally connected a pawl 81 by means of a pivot pin 82. Cooperating with said pawl 81 is a ratchet wheel 83 connected to the control shaft 20.

As one of the control pins moves into engagement with the bolt 75, this bolt is moved to the left as shown in Fig. 9, so that the pawl 81 rides over the teeth of the ratchet wheel 83. As soon as the control pin 70 has passed beyond engagement with the bolt 75, this bolt, under the action of the spring 78, is returned into position. During this return movement of the bolt 75, the pawl 81 will engage a tooth of the ratchet 83 and turn it through a small angle, thereby causing a corresponding rotation of the discs 21.

In the construction shown in Fig. 1, each disc 21 is provided with three slots spaced 120° apart, and the discs are relatively positioned so that a single actuation of the ratchet wheel 83 causes a slot of a different disc 21 to be moved opposite the opening 54 of its associated valve. The relative angular setting of the discs and the angular spacing of the slots is merely shown as an example, it being understood that these depend upon the control desired.

If it is desired to effect two consecutive operations at very close intervals, I provide the control pins with one or more stop members, so that the full return action of the bolt 75 is broken up into at least two separate movements. In the form shown in Figs. 6 and 7, the control pin is provided with a stop or shoulder 85 which engages the bolt 75 and interrupts the full return movement of said bolt. A further shoulder 86 may be provided, so that the full return movement of the spring bolt 75 is accomplished in three steps.

In Fig. 8 there is shown another form of control pin for effecting the rapid successive operation of the control shaft 20. In this form, the control pin 70 has screwed therein a stop member in the form of a bolt 87 extending from the side of the control pin away from the path of movement thereof. The amount to which this bolt 87 extends beyond the side of the control pin may be regulated merely by turning said bolt. If desired, a second stop bolt 88 may be screwed into the control pin to provide a second stopping place for the spring bolt 70 before said bolt returns to its normal inoperative position. These stop bolts may be removed entirely so that the spring bolt 70 may be operated in a manner as shown in Fig. 9.

Figure 6:
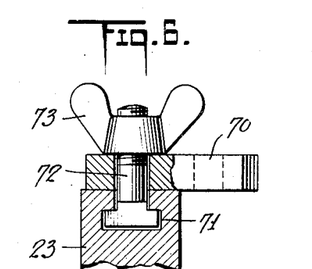
Fig. 6 is a partial section taken through a portion of the master control disc and showing one form of control pin.

For the type of control pin shown in Figs. 6 to 8, the pawl 81 and ratchet wheel 83 are so constructed that when a control pin 70 strikes the cam surface of the spring bolt 75, the pawl 81 will travel a distance equivalent to at least two teeth on the ratchet wheel 83. When the cam surface 70a passes the spring bolt 75, said bolt will return until the shoulder 85 in Fig. 7. or the stop bolt 87 in Fig. 8 engages the pin. During this return movement the pawl 81 will engage a tooth of the ratchet wheel 83 and move said wheel through a distance of one tooth. Further movement of the control pin 70 will cause said pin to ride past the shoulder 85 or stop bolt 87, so that the bolt 75 is permitted to return to its original position or in position to engage another stop if such additional stop is provided. This latter return movement of the bolt 75 causes a further rotation of the ratchet wheel 83 a distance equal to one tooth. By means of this arrangement, the operation of the control shaft 20 is effected in rapid succession.

It is often desirable to operate the control device by hand independently of the drive to effect operation of the working devices in any desired chronological order. For instance it may be desired to adjust the centrifugal machine or make alterations in the composition of the material to be centrifuged, or the like.

As a feature of the present invention, means are provided whereby the control mechanism may be operated by hand with very little manual effort. For that purpose, the shaft 89 on which the disc 23 is connected, has keyed or otherwise connected thereto a clutch hub or collar 90 having a locking nut 91 slidably mounted in a bore 91a formed therein. The bolt 91 is spring-pressed towards the disc 23, and for that purpose there is provided a coil spring 92 encircling said bolt and disposed between a collar 93 on said bolt and the outer end of the collar 90. Extending transversely in the control disc 23 is one or more holes 94 disposed at the same radial distance from the axis of the disc 23 as the locking bolt 91. The bolt 91 is normally spring-pressed into one of the holes 94 so as to lock the control disc 23 to the collar 90 and consequently to the shaft 89.

If it is desired to effect the disengagement of the control disc 23 from the shaft 89, the locking bolt 91 is pulled out to withdraw it from engagement with the hole 94, said bolt 91 being advantageously provided with a knob 95 to facilitate this withdrawal manipulation. The bolt 91 may be held in withdrawn position by slipping a cotter pin 98 in a slot formed in the bolt. The disc 23 is then free to be rotated into any selective position independently of the shaft 89. In order to facilitate this rotation of the disc 23, there is welded or otherwise secured thereto a hand wheel 96 having a hub portion 97 encircling the clutch collar 90.

Means are provided for indicating the operation which is taking place at any time inside of the centrifugal machine. Said means, in the specific form shown in Fig. 11, includes a disc 100 connected to the control shaft 20, and having one face thereof divided into a plurality of segments 101, the radial boundary lines of which represent the beginning and end of a working period. This disc 100 is encircled by a stationary ring 102 having a mark or arrow 103 for designating the segment on the disc 100 corresponding to the operation taking place in the centrifugal machine.

Figure 2:
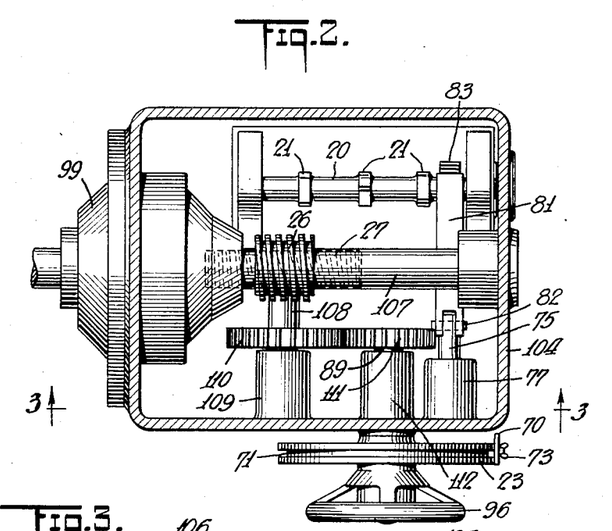
Fig. 2 is a horizontal section of a portion of the control device, and showing the members of the device arranged in a casing to form a compact unit.
Figure 3:
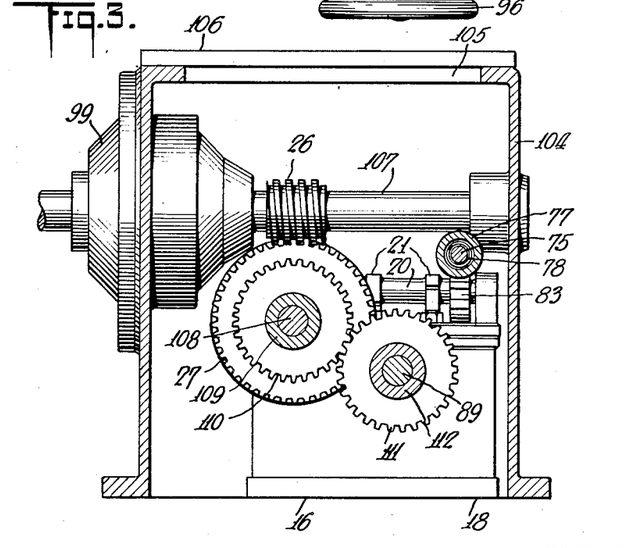
Fig. 3 is a section taken on the line 3—3 of Fig. 2.

In Figs. 2 and 3, there is shown the arrangement of the parts of the control into a compact unit. This unit is enclosed in a casing or housing 104 having an opening 105 at the top or other part thereof normally closed by a cover 106, and serving as a means of access to the interior of the casing. In this construction, the speed reduction gearing 25 is enclosed in a casing 99 supported in the casing 104, and has an outlet shaft 107 on which is mounted the worm 26 meshing with the worm wheel 27. This worm wheel 27 is mounted on a shaft 108 which is journaled in a boss 109 extending inwardly from the wall of the casing 104.

Also connected to the shaft 108 is a spur gear 110 which meshes with a spur gear 111 connected to the shaft 89 on which the disc 23 is mounted. This shaft 89 is journaled in a boss 112 extending inwardly from the wall of the casing 104. The two gears 110 and 111 are of different sizes and are demountable from their respective shafts, so that they may be interchanged to change the speed ratio between the shaft 108 and the control disc shaft 89.

Also enclosed in the casing 104 are the three reversing valves 16, 17 and 18, and the control shaft 20 associated therewith. This control shaft 20 extends substantially parallel to the shaft 107. The guide casing 77 for the bolt 75 is in the form of a boss extending inwardly from the wall of the control casing 104.

The control device of the present invention can be used to good advantage in connection with a plant consisting of several centrifugal drums, particularly of the so-called twin machine type in which each drum is equipped with a control device. In this type of plant, I effect the operation of the control discs 23 from a common drive, each control disc being disengageable from the common drive, so that it can be operated by hand without disturbing the automatic operation of the other control disc or discs. By means of this arrangement, I can manually turn a control disc in any relative angular position with respect to the disc or discs to obtain any desired phase relation between the operations of the various centrifugal machines.

Figure 4:
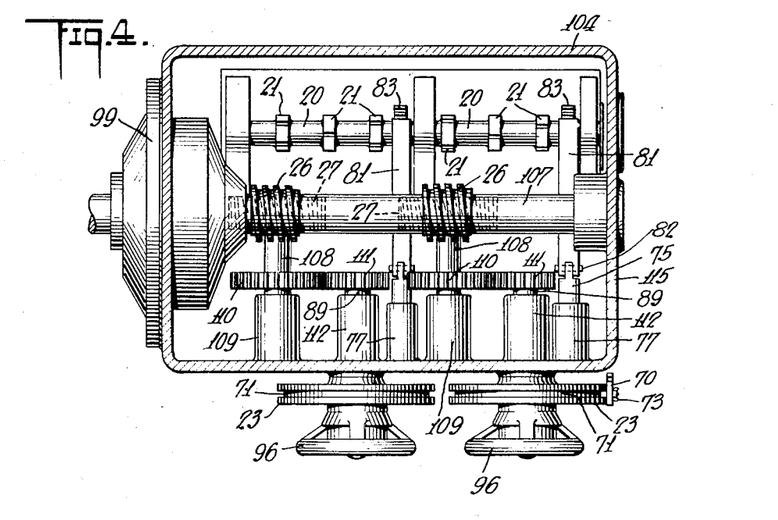
Fig. 4 is a horizontal section showing control devices for two centrifugal machines, and showing the members of the two devices arranged in a casing to form a compact unit.

In Fig. 4 there is shown a construction suitable for a twin centrifugal installation, and comprising two control devices located side by side in a common housing 115. In this construction, two worms 26 are arranged in tandem on the shaft 107, so that they are driven by the same motor. These worms mesh respectively with two worm wheels 27 which operate two control discs 23 through a gear chain similar to that already described. The construction of the individual control devices is similar to that already described, and the devices are duplicates.

By adjusting the angular velocity of the control disc 23 and the circumferential distance between successive control pins, and also by having the discs 21 set in proper relative angular position, I can effect certain operations such as the filling of the centrifugal drum, handling of the material to be centrifuged, emptying of the drum and the like, in any desired sequence at regular or controlled intervals. By changing the position of the control pins 70, it is possible to change the time intervals at which the fluid actuated motors are reversed, and consequently the duration of operation of the working devices associated therewith. The intervals during which these working devices are operated also depend on the angular velocity of the control disc 23. Assuming that the change in the position of the control pins 70 does not give the desired duration of operation of the working devices, the angular velocity of the control disc 23 must then be changed. This change in angular velocity of the control disc may be effected, for instance, by exchanging the gears 110 and 111.

In case of disturbances in the operation of the centrifugal machine, it may become suddenly necessary to institute a function of said machine which is out of the usual order. This may be brought about by relieving the actuating pressure in one of the reversing valves by opening the valve 63 associated therewith. The operation of this reversing valve will then be discontinued, so that it is possible to interpolate certain functions out of the usual sequence at any time while the machine is in operation.

Having thus described my invention, what I claim as new and desire to secure by Letters Patent is:—

1. A device for controlling centrifugal separators, including a rotatable master control member, a plurality of fluid actuated motors, a corresponding number of reversing valves, each having a valve member in the form of a stepped piston, means for delivering actuating fluid to each of said valves, means for varying the resultant fluid actuating pressure on the steps of said piston to reverse the axial position of said said piston at intervals corresponding to the operation of said master control member, and means for delivering actuating fluid to said motors in accordance with the positions of said pistons.

2. A device for controlling centrifugal separators, including a rotatable master control member, a plurality of fluid actuated motors, a corresponding number of reversing valves, each having a valve member in the form of a stepped piston, a source of fluid pressure, means for delivering actuating fluid from said source to one of said valves and successively from one valve to another, means for varying the resultant fluid actuating pressure on the steps of said piston to reverse the axial position of said piston at intervals corresponding to the operation of said master control member, and means for delivering said actuating fluid to said motors in accordance with the positions of said pistons after passing through said valves.

3. A device for controlling the automatic operation of machines especially of centrifugal separators, so that certain functions or series of steps therein may be automatically repeated at controlled intervals, and of the class wherein there are provided a rotatable master control disc for timing the interval between successive functions, a plurality of fluid actuated motors connected to the devices which perform said functions, a corresponding number of reversing valves for said motor, and means for delivering actuating fluid to each of said valves, characterized by the fact that each valve has a valve member in the form of a stepped piston, and there are combined with said valve a control member operated by said control disc, means operable in accordance with the position of said control member for varying the resultant fluid actuating pressure upon the steps of said piston to reverse the axial position of said piston, and means for delivering actuating fluid to one of said motors in accordance with the position of said piston.

4. A device for controlling the automatic operation of machines especially of centrifugal separators, so that certain functions or series of steps therein may be automatically repeated at controlled intervals, and of the class wherein there are provided a rotatable master control member for timing the interval between successive functions, a plurality of fluid actuated motors connected to the devices which perform said functions, a corresponding number of reversing valves for said motors, and means for delivering actuating fluid to each of said valves, characterized by the fact that each valve includes a valve member in the form of a stepped piston having at least three piston sections of different diameters, and has a pair of ports controlled respectively by the two smaller piston sections, for controlling the delivery of actuating fluid from said valve through said ports to one of said motors, and characterized further by the fact that there is combined with said valve, means operable by said master control member for varying the resultant fluid actuating pressure upon the steps of said piston to reverse the axial position of said piston.

5. A device for controlling the automatic operation of machines especially of centrifugal separators, so that certain functions or series of steps therein may be automatically repeated at controlled intervals, and of the class wherein there are provided a master control disc for timing the interval between successive functions, a plurality of fluid actuated motors connected to the devices which perform said functions, a corresponding number of reversing valves for said motors, and means for delivering actuating fluid to each of said valves, characterized by the fact that each valve includes a valve member in the form of a stepped piston having at least three sections of different diameters, said valves being provided with bores in which each of said sections is slidable, and having a pair of outlet ports controlled respectively by the two smaller piston sections for controlling the delivery of actuating fluid from said valve through said ports to one of said motors, said piston being provided with a passageway through which actuating fluid is delivered behind the largest piston section, and the bore in which said largest piston section moves having an opening, and characterized further by the fact that there is combined with said valve a control member operated from said master control disc for controlling the outlet of said opening and to thereby control the resultant fluid actuating pressure upon said piston.

6. A device for controlling the automatic operation of machines especially of centrifugal separators, so that certain functions or series of steps therein may be automatically repeated at controlled intervals, and of the class wherein there are provided a master control disc for timing the interval between successive functions, a plurality of fluid actuated motors connected to the devices which perform said functions, a corresponding number of reversing valves for said motors, and means for delivering actuating fluid to each of said valves, characterized by the fact that each valve includes a valve member in the form of a stepped piston having a plurality of piston sections of different diameters, said valves being provided with bores in which each of said sections is slidable, said piston being provided with a passageway through which actuating fluid is delivered behind one of said piston sections, the bore in which said latter section moves being provided with an outlet, and characterized further by the fact that there is combined with said valve a rotary member having a slot extending to the periphery thereof, said rotary member controlling said outlet, whereby the resultant fluid actuating pressure upon said piston is varied in accordance with the position of said slot, and means for intermittently turning said rotary member in response to the actuation of said master control disc.

7. A device for controlling the automatic operation of machines especially of centrifugal separators, so that certain functions or series of steps therein may be automatically repeated at controlled intervals, and of the class wherein there are provided a rotatable master control member for timing the interval between successive functions, a plurality of fluid actuated motors connected to the devices which perform said functions, a corresponding number of reversing valves for said motors, and means for delivering actuating fluid to each of said valves, characterized by the fact that each valve includes a valve member in the form of a stepped piston having a plurality of piston sections of different diameters, said piston being provided with a passageway through which actuating fluid is delivered behind one of said piston sections, the portion of the valve in which said latter piston section moves being provided with an opening, and characterized further by the fact that there is combined with said valve a control shaft, a control member connected to said shaft for controlling the outlet of said opening whereby the resultant fluid actuating pressure upon said piston is varied, a ratchet wheel connected to said shaft, a pawl cooperating with said ratchet wheel, a spring for urging said pawl in normal inoperative position, means on said master control member for operating said pawl against the action of said spring when said master control member is rotated into a predetermined angular position, said pawl being so positioned as to ride over the teeth of said ratchet wheel when operated by said latter means, but engaging a tooth of said wheel on the return movement of said pawl to rotate said control shaft a predetermined amount.

8. A device for controlling centrifugal separators, including a master control disc, means for rotating said disc, a plurality of fluid actuated motors, a corresponding number of valves for controlling the operation of said motors, and means for intermittently operating said valves in accordance with the operation of said disc, and including one or more control pins connected to said disc and extending therefrom, a pawl operated by said control pins as they move into a predetermined position, a spring for urging said pawl against the action of said control pins, a ratchet wheel cooperating with said pawl, said pawl riding over the teeth of said ratchet wheel when said pawl is moved by the action of said control pins, and engaging a tooth of said wheel during the return movement of said pawl under the action of said spring so as to rotate said ratchet wheel, and a stop member on each of said control members for interrupting the full return movement of said pawl under the action of the spring, so that said full return movement will be effected in at least two steps in rapid succession.

9. A control device as specified in claim 8, characterized in that the stop member is formed by a step in said pin so as to form a shoulder.

10. A control device as specified in claim 8, characterized in that the stop member comprises a screw extending into the stop member, whereby said member may be adjusted in an axial direction so as to extend any desired amount from the side of the control pin.

11. A device for controlling centrifugal separators, including a master control disc, means for rotating said disc at a substantially constant speed, a plurality of fluid actuated motors, a corresponding number of reversing valves for controlling the operation of said motors, a control shaft normally stationary for controlling the operation of said reversing valves, said disc having an annular slot therein, a pin engaging said slot and slidable in any selective position therein, means for locking said pin in any selective position in said slot, and means actuated by said pin when the latter is moved into predetermined position by the rotation of said disc for rotating said control shaft a predetermined amount.

12. A device for controlling centrifugal separators, including a master control disc, means for rotating said disc at a substantially constant speed, a plurality of fluid actuated motors, a corresponding number of reversing valves for controlling the operation of said motors, a control shaft normally stationary for controlling the operation of said reversing valves, said disc having a circumferential T-shaped slot on the periphery thereof, a bolt having a T-shaped head slidable in said slot, a control pin connected to said bolt and extending from said disc, and means actuated by said pin when the latter is moved into predetermined position by the rotation of said disc for rotating said control shaft a predetermined amount.

13. A device for controlling centrifugal separators, including a master control member, a drive for rotating said member, a plurality of fluid actuated motors, a corresponding number of valves for controlling the operation of said motors at intervals corresponding to the operation of said master control member, and means for disengaging said master control member from said drive so that said member may be operated independently of said drive to effect manual control in the operation of said fluid actuated motors.

14. A device for controlling centrifugal separators, including a drive shaft, a master control member on said shaft, a plurality of fluid actuated motors, means for operating said motors automatically in regular or controlled intervals in accordance with the operation of said control member, and means for disengaging said master control member from the drive shaft, whereby said control member may be manually operated to effect manual control of the fluid actuated motors, said last mentioned means including a collar connected to said shaft, and a locking bolt carried by said collar and movable into engagement with said member to lock said disc to said collar.

15. A device for controlling the automatic operation of machines especially of centrifugal separators, so that certain functions or series of steps therein may be automatically repeated at controlled intervals, and of the class wherein there are provided a master control disc for timing the interval between successive functions, a plurality of fluid actuated motors connected to the devices which perform said functions, a corresponding number of reversing valves for said motors, and means for delivering actuating fluid to each of said valves, characterized by the fact that each valve includes a valve member in the form of a stepped piston having a plurality of piston sections of different diameters, the largest piston section being slidable in a bore having a close sliding fit in said section, means for delivering fluid under pressure to said bore behind said last mentioned section, and a supplemental hand-operated valve for controlling the pressure behind said largest piston section.

16. A device for controlling centrifugal separators so that certain functions or series of steps therein may be automatically repeated at controlled intervals, including a master control member, means for rotating said member, a plurality of fluid actuated motors connected to the devices which perform said functions, a corresponding number of reversing valves, each having a valve member in the form of a stepped piston, means for delivering actuating fluid to each of said valves, means for varying the resultant fluid actuating pressure on the steps of said piston to reverse the axial position of said piston at intervals corresponding to the operation of said master control member, means for delivering actuating fluid to said motors in accordance with the position of said piston, and an indicating device automatically operable to indicate the particular function occurring inside of said separator.

17. A device for controlling centrifugal separators so that certain functions or series of steps therein may be automatically repeated at controlled intervals, including a master control member, means for rotating said member, a plurality of fluid actuated motors connected to the devices which perform said functions, a corresponding number of reversing valves, a control shaft, control members connected to said shaft, and each controlling the operation of one of said valves, means for rotating said control shaft intermittently in accordance with the operation of said master control member, means for delivering actuating fluid to said motors in accordance with the positions of said valves, and an indicating device automatically operable to indicate the particular function occurring inside of said separator, said device including a member connected to said control shaft, and a fixed member indicatively cooperating with said last mentioned member, one of the members of said indicating device having indications thereon corresponding to said functions.

18. An apparatus for controlling a pair of centrifugal separators, including a drive shaft, and a pair of control devices for each of said centrifugal separators, and each including a master control member operated from said drive shaft, a plurality of fluid actuated motors, a corresponding number of reversing valves for controlling the operation of said motors, means for reversing said valves at intervals corresponding to the operation of said master control member, and means for delivering actuating fluid to said motors in accordance with the positions of said valves.

19. An apparatus for controlling a pair of centrifugal separators, including a drive shaft, and a pair of control devices for each of said centrifugal separators, and each including a master control member operated from said drive shaft, a plurality of fluid actuated motors, a corresponding number of reversing valves for controlling the operation of said motors, means for reversing said valves at intervals corresponding to the operation of said master control member, means for delivering actuating fluid to said motors in accordance with the positions of said valves, and means for selectively disengaging either one of said master control members from said drive shaft whereby the disengaged control member may be manually operated to effect manual control of one of said centrifugal separators without interrupting the automatic operation of the other centrifugal separator.

20. A device for controlling centrifugal separators, including a casing, a shaft in said casing and having a portion thereof extending outside said casing, a master control member on said shaft outside of said casing, a plurality of fluid actuated motors, a corresponding number of reversing valves in said casing, a control shaft in said casing, means including a plurality of control members connected to said latter shaft for controlling the operation of said valves, means for driving said first mentioned shaft, means disposed in said casing for intermittently rotating said control shaft a predetermined amount in accordance with the operation of said master control member, and means for delivering actuating fluid to said motors in accordance with the positions of said valves.

GUSTAV ter MEER.